(12) United States Patent
Kataoka et al.

(10) Patent No.: US 10,303,672 B2
(45) Date of Patent: May 28, 2019

(54) SYSTEM AND METHOD FOR SEARCH INDEXING

(71) Applicant: FUJITSU LIMITED, Kawasaki-shi, Kanagawa (JP)

(72) Inventors: Masahiro Kataoka, Tama (JP); Takahiro Murata, Yokohama (JP); Naoki Akiyama, Sagamihara (JP)

(73) Assignee: FUJITSU LIMITED, Kawasaki-shi (JP)

( * ) Notice: Subject to any disclaimer, the term of this patent is extended or adjusted under 35 U.S.C. 154(b) by 137 days.

(21) Appl. No.: 15/401,980

(22) Filed: Jan. 9, 2017

(65) Prior Publication Data
US 2017/0116240 A1 Apr. 27, 2017

Related U.S. Application Data

(63) Continuation of application No. 14/256,662, filed on Apr. 18, 2014, now Pat. No. 9,576,008.

(30) Foreign Application Priority Data

Apr. 30, 2013 (JP) .................. 2013-095684

(51) Int. Cl.
*G06F 16/13* (2019.01)
*G06F 16/14* (2019.01)
(Continued)

(52) U.S. Cl.
CPC .......... *G06F 16/2237* (2019.01); *G06F 16/13* (2019.01); *G06F 16/148* (2019.01); *G06F 16/2228* (2019.01); *G06F 16/319* (2019.01)

(58) Field of Classification Search
CPC ......... G06F 17/30106; G06F 17/30091; G06F 17/30321; G06F 17/30324; G06F 16/148;
(Continued)

(56) References Cited

U.S. PATENT DOCUMENTS 5,469,354 A 11/1995 Hatakeyama et al.
5,745,745 A * 4/1998 Tada ........................ G06F 16/81
707/E17.123
(Continued)

FOREIGN PATENT DOCUMENTS

JP 05-174064 7/1993
JP 08-147311 6/1996
(Continued)

OTHER PUBLICATIONS

Office Action dated Oct. 4, 2016, in Japanese Patent Application No. 2013-095684 (with partial English language translation).

*Primary Examiner* — Phong H Nguyen
(74) *Attorney, Agent, or Firm* — XSensus LLP

(57) ABSTRACT

A system includes circuitry configured to: read a plurality of character information and a plurality of identifiers that are included in a text file; determine whether a character information among the plurality of character information is included between the at least one pair of identifiers among the plurality of identifiers in the text file; and associate the character information with the at least one pair of identifiers when it is determined that the character information is included between the at least one pair of identifiers.

18 Claims, 16 Drawing Sheets

(51) Int. Cl.
*G06F 16/22* (2019.01)
*G06F 16/31* (2019.01)

(58) Field of Classification Search
CPC .. G06F 16/13; G06F 16/2228; G06F 16/2237; G06F 16/319
USPC ........................................ 707/706, 741, 745
See application file for complete search history.

(56) References Cited

U.S. PATENT DOCUMENTS

| | | | |
|---|---|---|---|
| 7,882,083 B2* | 2/2011 | Kataoka | G06F 16/90335 707/692 |
| 2003/0103034 A1* | 6/2003 | Silverbrook | B41J 2/17503 345/156 |
| 2005/0144162 A1* | 6/2005 | Liang | G06F 16/355 707/E17.108 |
| 2006/0029296 A1* | 2/2006 | King | H04N 1/00244 382/313 |
| 2006/0287971 A1* | 12/2006 | Armstrong | G06F 16/382 707/E17.097 |
| 2008/0098024 A1* | 4/2008 | Kataoka | G06F 16/90335 707/E17.14 |
| 2010/0262622 A1* | 10/2010 | Saito | G06F 16/29 707/780 |
| 2013/0086086 A1* | 4/2013 | Kataoka | G06F 16/319 707/750 |

FOREIGN PATENT DOCUMENTS

| | | |
|---|---|---|
| JP | 08-329116 | 12/1996 |
| JP | 11-053400 | 2/1999 |

\* cited by examiner

FIG. 5

| | | 1 | 2 | 3 | ... | Qi | ... | n |
|---|---|---|---|---|---|---|---|---|
| | | ⋮ | ⋮ | ⋮ | ... | ⋮ | ... | ⋮ |
| <SYMPTOM> | f → | 1 | 1 | 0 | ... | 0 | ... | 0 |
| | FEVER → | 1 | 1 | 0 | ... | 0 | ... | 0 |
| | DEVELOP → | 1 | 1 | 1 | ... | 1 | ... | 0 |
| | | ⋮ | ⋮ | ⋮ | ... | ⋮ | ... | ⋮ |
| | | ⋮ | ⋮ | ⋮ | ... | ⋮ | ... | ⋮ |
| <DRUG EFFICACY> | f → | 1 | 0 | 0 | ... | 0 | ... | 0 |
| | FEVER → | 1 | 0 | 0 | ... | 0 | ... | 0 |
| | DEVELOP → | 1 | 0 | 1 | ... | 0 | ... | 0 |
| | | ⋮ | ⋮ | ⋮ | ... | ⋮ | ... | ⋮ |
| | | ⋮ | ⋮ | ⋮ | ... | ⋮ | ... | ⋮ |
| <SIDE EFFECT> | f → | 0 | 1 | 0 | ... | 0 | ... | 0 |
| | FEVER → | 0 | 1 | 0 | ... | 0 | ... | 0 |
| | DEVELOP → | 0 | 1 | 0 | ... | 1 | ... | 0 |
| | | ⋮ | ⋮ | ⋮ | ... | ⋮ | ... | ⋮ |
| | | ⋮ | ⋮ | ⋮ | ... | ⋮ | ... | ⋮ |
| | Qj | 1 | 0 | 0 | ... | 0 | ... | 0 |
| | | ⋮ | ⋮ | ⋮ | ... | ⋮ | ... | ⋮ |

FIG. 6

| CHARACTER INFORMATION | OFFSET VALUE |
|---|---|
| ⋮ | ⋮ |
| f | 0×0BF |
| FEVER | 0×30E |
| DEVELOP | 0×3A8 |
| ⋮ | ⋮ |

| CHARACTER INFORMATION | OFFSET VALUE |
|---|---|
| ⋮ | ⋮ |
| f | 0×080 |
| FEVER | 0×16A |
| DEVELOP | 0×1B8 |
| ⋮ | ⋮ |

FIG. 8

| TAG | CHARACTER INFORMATION | OFFSET VALUE |
|---|---|---|
| ⋮ | ⋮ | ⋮ |
| <SYMPTOM> | f | 0×00BF |
| <SYMPTOM> | FEVER | 0×030E |
| <SYMPTOM> | DEVELOP | 0×03A8 |
| ⋮ | ⋮ | ⋮ |
| <GENDER> | MALE | 0×189C |
| <GENDER> | FEMALE | 0×189D |
| ⋮ | ⋮ | ⋮ |

T3

SYSTEM AND METHOD FOR SEARCH INDEXING

CROSS-REFERENCE TO RELATED APPLICATION

This application is a continuation application of U.S. application Ser. No. 14/256,662, filed Apr. 18, 2014, which is based upon and claims the benefit of priority from the prior Japanese Patent Application No. 2013-095684 filed on Apr. 30, 2013, the entire contents of each of which are incorporated herein by reference.

FIELD

The embodiment discussed herein relates to a system, a method and a computer-readable medium for a search indexing.

BACKGROUND

There are technologies that, in a full-text search on a file group, use a full-text search index indicating the character information making up the files included in the file group, to narrow down search-target files from the file group. By referring to the full-text search index, files that do not include the character information of a search character string are excluded from the search targets, and the search-target files are thereby narrowed down.

In certain technologies, a full-text search is carried out with respect to a file group that has been written in a markup language. The files included in the file group written in the markup language are logically (or physically) divided with tags serving as boundaries, and a full-text search index that indicates the character information making up each data unit obtained by this dividing is created. Furthermore, when a search character string and a tag are input, data units that do not correspond to the input tag and data units that do not include the character information of the search character string are excluded from the search targets, and search-target data units are thereby narrowed down (for example, refer to Japanese Laid-open Patent Publication No. 8-329116 or Japanese Laid-open Patent Publication No. 8-147311).

SUMMARY

According to an aspect of the invention, a system includes circuitry configured to: read a plurality of character information and a plurality of identifiers that are included in a text file; determine whether a character information among the plurality of character information is included between the at least one pair of identifiers among the plurality of identifiers in the text file; and associate the character information with the at least one pair of identifiers when it is determined that the character information is included between the at least one p air of identifiers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 depicts an example of a full-text search index;

FIG. 6 depicts an example of a conversion table;

FIG. 7 depicts an example of a conversion table;

FIG. 8 depicts an example of a conversion table;

DESCRIPTION OF EMBODIMENT

First, the considerations of the inventors are described. In a markup language, it is possible for hierarchical data structures to be formed, and data units mutually having an inclusive relationship are formed by a plurality of tags being nested. For example, when tags are arranged in the sequence of an opening tag for tag A, an opening tag for tag B, a closing tag for tag B, and a closing tag for tag A, the data unit for which the scope is designated by tag B is included in the data unit for which the scope is designated by tag A. Since tag A applies an attribute to a data unit that includes the data unit corresponding to tag B, tag A functions as a higher-level tag than tag B.

However, when files are logically (or physically) divided with tags serving as boundaries, data units that mutually have an inclusive relationship are not formed. Thus, when a full-text search index is created for the data units formed by dividing files, it is not possible to handle nested structures of tags, and with regard to tags corresponding to data units that mutually have an inclusive relationship, it is not possible for both tags to be used as conditions for narrowing down search targets.

According to the embodiment described hereafter, with regard to data units that mutually have an inclusive relationship, both of the attributes of each of the data units are able to be used as search control conditions.

Figure 1:
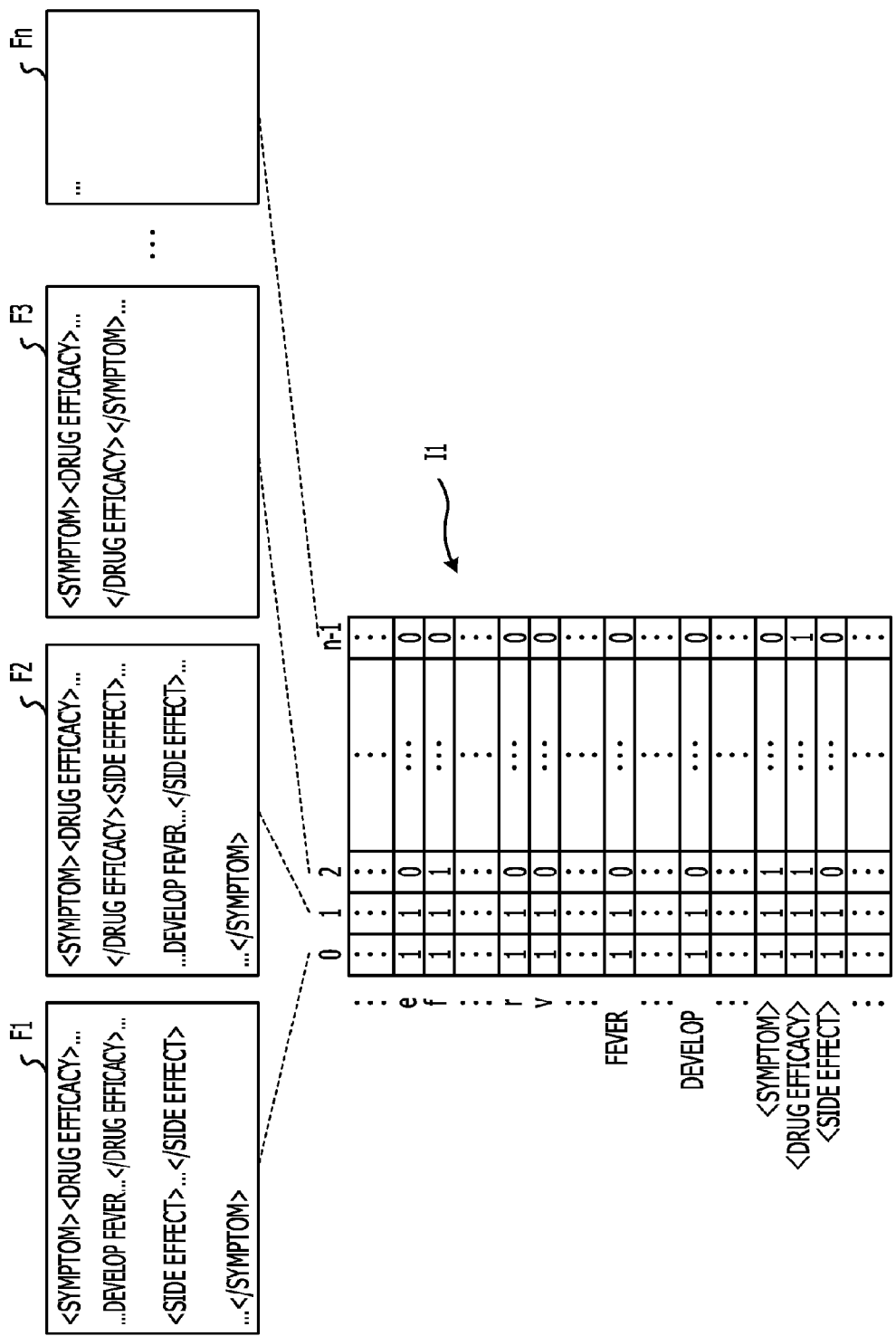
FIG. 1 depicts an example of the narrowing down of search targets by using a full-text search index.

FIG. 1 depicts an example of search-target narrowing down in which a full-text search index is used. Each file of the file group (files F1 to Fn) exemplified in FIG. 1 is an extensible markup language (XML) file that indicates the records of a clinical trial. In a markup language such as XML, information such as an attribute is added to text by using character strings that are referred to as tags. Tags function as sets of opening tags and closing tags, and indicate the addition of information to the data that is between an opening tag and a closing tag. Each of the files F1 to Fn includes tags, and, for example, symptom tags (<symptom> and </symptom>) and drug efficacy tags (<drug efficacy> and </drug efficacy>) and so forth are included in the file F1. For example, by using a drug efficacy tag, an attribute that is data relating to "drug efficacy" is added to the data between an opening tag <drug efficacy> and a closing tag </drug efficacy>. In other words, the data between the opening tag <drug efficacy> and the closing tag </drug efficacy> has the "drug efficacy" attribute due to being surrounded by the drug efficacy tags.

In searching the files F1 to Fn exemplified in FIG. 1, a full-text search index I1 exemplified in FIG. 1 is used to narrow down the search scope. The full-text search index I1 includes, for each of the search-target files F1 to Fn, configuration information that indicates the configuration of the character information included in the files. The configuration information is a bit column in which the types of character information included in a file are configured from a plurality of bits that correspond to the types of character information.

In the full-text search index I1, the files F1 to Fn are managed by using numbers that are allocated to each of the files F1 to Fn. Numbers are allocated with the number of the file F1 being "0", the number of the file F2 being "1", the number of the file F3 being "2", and with the number "3" and thereafter also being allocated in the same manner. For example, the configuration information of the file F1 is the bit column in the number "0" location in the full-text search index I1.

In the full-text search index I1, character information is associated with bit locations in the bit columns, and the bits making up the bit columns indicate whether or not the character information corresponding to the bit location in question is included in the file. For example, a bit having a value of "1" indicates that the character information corresponding to the bit location of that bit is included in the file. For example, when the value of the bit corresponding to the character information "f" in the number "0" bit column is "1", it is indicated that the character information "f" is included in the file F1.

In the full-text search index I1, the character information associated with the bit locations in the bit columns is a character, a portion of a character (for example, one byte of data or the like of a character code expressed by a plurality of bytes), or a character string (words and tags), which is a combination of characters, or the like. In other words, the full-text search index I1 indicates whether or not each of the characters, character portions, and character strings corresponding to the bit locations in the bit columns are included in each of the files F1 to Fn. For example, characters such as "f", "e", "v", and "r", and character strings such as "develop" and "fever" and character strings that indicate tags such as "<drug efficacy>" are associated with the bit locations of the bit columns in the full-text search index.

If a user wishes to acquire, from the files F1 to Fn, records in which the symptom of developing a fever has been obtained as an effect of a drug, for example, the user requests a search in which the "develop fever" character information and the drug efficacy tag and so forth serve as search conditions. In this case, files having a possibility of including the "develop fever" and the "<drug efficacy>" character information are narrowed down based on bit rows (horizontal lines of bits in the full-text search index I1 exemplified in FIG. 1) constituted by the bits in the bit locations corresponding to the "develop", "fever", and "<drug efficacy>" character information included in the search character string. Specifically, one bit row is generated by a logical product (AND) calculation of the bit rows corresponding to each of "develop", "fever", and "<drug efficacy>", and the files of the numbers having bit values of "1" in the generated bit row become search targets. In the full-text search index I1, both the file F1 (number "0") and the file F2 (number "1") become search targets. This is because the bit values are "1" for the number "0" and the number "1" in the bit columns for all of "develop", "fever", and "<drug efficacy>".

However, although the "develop fever" character information is surrounded by the opening tag <drug efficacy> and the closing tag </drug efficacy> in the file F1, the "develop fever" character information is not surrounded by the opening tag <drug efficacy> and the closing tag </drug efficacy> in the file F2. Thus, in the search for acquiring records in which the symptom of developing a fever has been obtained as an effect of a drug, the file F2 becomes a search target despite not including the desired record. In this way, the scopes designated by tags and the positional relationships with character information are not reflected in the full-text search index I1. Thus, even if a tag and a search character string are designated as search conditions, in the narrowing down conducted by using the full-text search index I1, there is a possibility that files that do not include the search character string having the attribute corresponding to the tag may also become search-target files.

Furthermore, for example, in the file F1, the opening tag <drug efficacy> and the closing tag </drug efficacy> of the drug efficacy tag are included between the opening tag <symptom> and the closing tag </symptom>. In this kind of tag positional relationship, for example, the types of symptoms that appeared in a clinical trial are indicated between an opening tag <symptom> and a closing tag </symptom>, and, in addition, the symptoms that appeared as an effect of a drug from among the symptoms are indicated between an opening tag <drug efficacy> and a closing tag </drug efficacy>. In other words, because the data between the opening tag <drug efficacy> and the closing tag </drug efficacy> is surrounded by the opening tag <symptom> and the closing tag </symptom>, this data has both the "drug efficacy" and the "symptom" attributes.

If the user wishes to acquire records in which the symptom of developing a fever has been obtained as an effect of a drug, a search in which "develop fever" and the drug efficacy tag serve as search conditions is requested. On the other hand, for example, if the user wishes to acquire any record in which a fever developed as a symptom, be it a fever that developed as the effect of a drug or a fever that developed as a side effect of a drug and so forth, a search in which "develop fever" and the symptom tag serve as search conditions is requested. In other words, there are cases where a certain specific attribute is added as a search condition in accordance with the intention of the user requesting the search, and there are also cases where an attribute of a broad concept that includes the specific attribute is added as a search condition.

With regard to attributes that mutually have an inclusive relationship, in order to make it possible to narrow down search targets when either of the attributes serves as a search condition, it is preferable for the configuration information in the data units corresponding to each of the attributes to be included in the full-text search index. A full-text search index that includes configuration information for each of the data units that mutually have an inclusive relationship is described hereafter.

Figure 2:
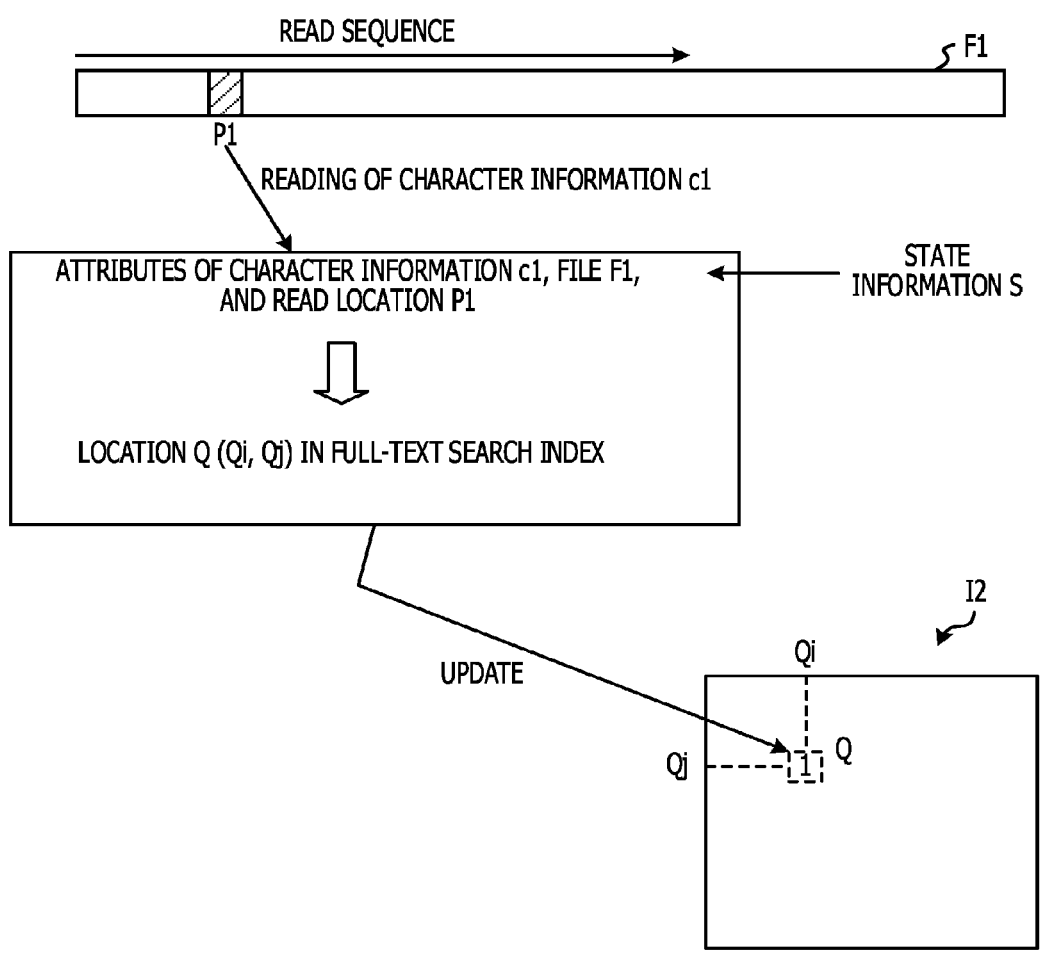
FIG. 2 depicts an overview of a full-text search index generation procedure.

FIG. 2 depicts an overview of a full-text search index generation procedure. From a state in which the values of all of the bits in a full-text search index I2 are "0", the files F1 to Fn are sequentially read, and the values in the full-text search index I2 are updated in accordance with the character information that has been read. For example, in the read processing of the file F1, the character information in the file F1 is sequentially read in accordance with a read sequence.

When the full-text search index I1 is updated based on the character information in the file F1, the generation of the portion relating to the file F1 in the full-text search index I2 ends. The full-text search index I2 is generated by the same processing being carried out also for files F2 to Fn.

In the example of FIG. 2, update processing of the full-text search index I2 in the case where character information c1 has been read at a read location P1 is exemplified. When the character information c1 is read, a location Q (indicated by two-dimensional coordinates (Qi,Qj) in FIG. 2) in the full-text search index I2 is obtained based on the character information c1, the number of the file F1 that is the target of the read processing, and the attributes of the data at the read location P1. When the location Q is obtained, the value of the bit at the location Q is updated. Specifically, the logical sum of the value of the bit at the location Q and "1" is stored at the location Q.

In the generation procedure of FIG. 2, the location Q in the full-text search index I2 that is updated in accordance with the character information is decided based on the attributes at the read location P1. As previously described, attributes are applied by tags that surround data. In other words, in the read location P1, an attribute is applied by a tag in which the opening tag has been read leading up to the read location P1 and the closing tag has not been read. In the present embodiment, state information S that indicates tags of which the opening tag has been read and the closing tag has not been read is updated in accordance with the reading of tags in such a way that the attributes in the read location are determined. The state information S is described hereafter based on FIG. 3. If it is indicated in the state information S that a plurality of attributes have been applied at a read location, the full-text search index is updated based on each of the plurality of attributes.

Figure 3:
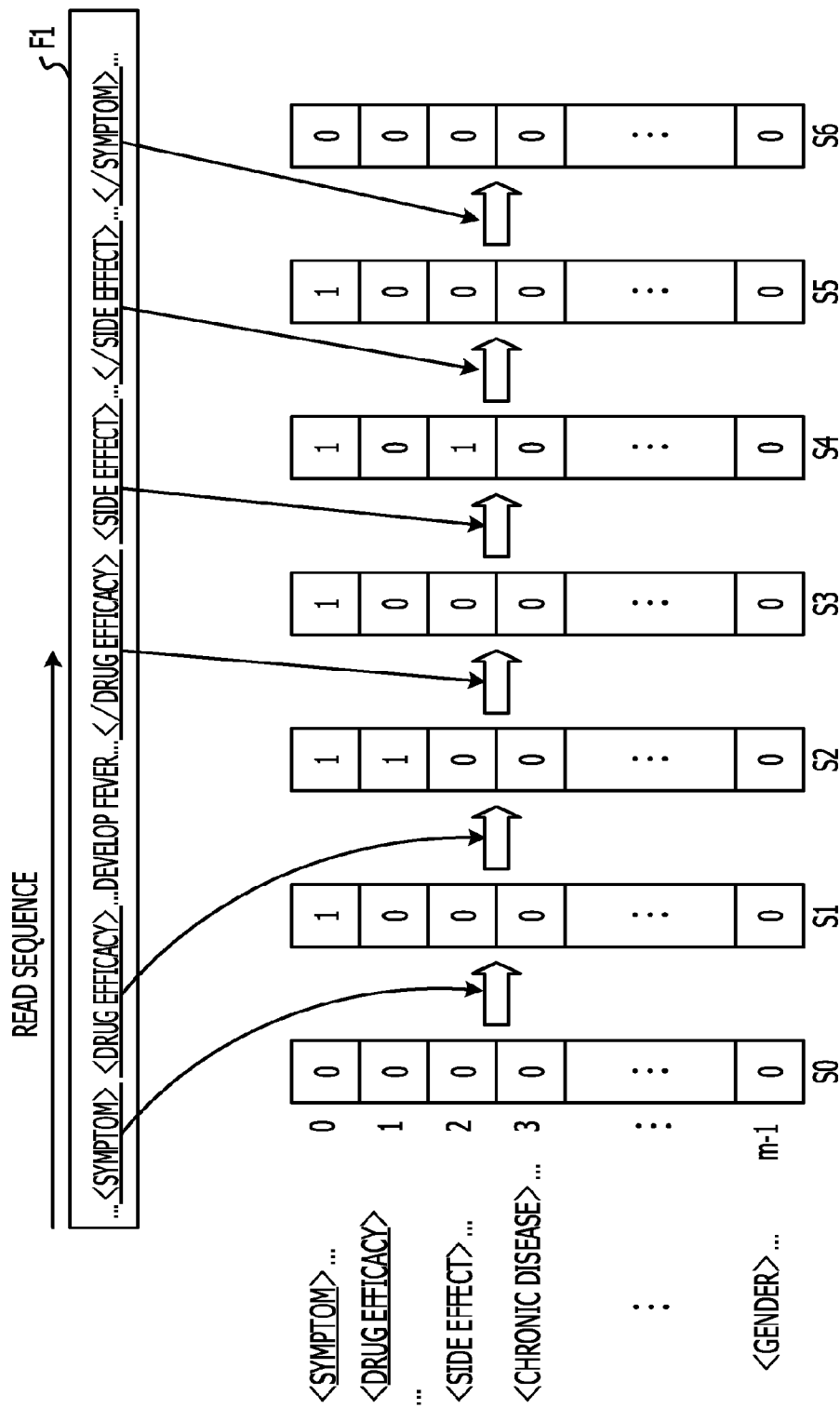
FIG. 3 depicts an example of the updating of state information.

FIG. 3 depicts an example of the updating of state information. In FIG. 3, the updating of the state information S in accordance with the reading of the tags included in the file F1 is indicated by state information S0 to S6 in the steps of the reading of the file F1. In the example of FIG. 3, m types of tags that are able to be designated as search conditions are set in advance. The state information S (state information S0 to S6) exemplified in FIG. 3 is a bit column of m−1 bits configured from bits arranged in locations having numbers (0 to m−1) that correspond to the m types of tags.

In the example of FIG. 3, the number of the symptom tag is "0", the number of the drug efficacy tag is "1", the number of the side effect tag is "2", the number of the chronic disease tag is "3", and the number of the gender tag is "m−1".

The side effect tag functions as a set of an opening tag <side effect> and a closing tag </side effect>, and indicates that data between the opening tag <side effect> and the closing tag </side effect> has a "side effect" attribute. The chronic disease tag functions as a set of an opening tag <chronic disease> and a closing tag </chronic disease>, and indicates that data between the opening tag <chronic disease> and the closing tag </chronic disease> has a "chronic disease" attribute. The gender tag functions as a set of an opening tag <gender> and a closing tag </gender>, and indicates that data between the opening tag <gender> and the closing tag </gender> has a "gender" attribute.

In the state information S0 before the file is read, since none of the opening tags have been read, the values of the bits are "0" for the numbers "0" to "m−1". When sequential reading is carried out from the file F1, and the opening tag <symptom> is read, because the next data from the read location has the "symptom" attribute, the value of the number "0" bit corresponding to the symptom tag changes from "0" to "1". The state information S0 is thereby updated to the state information S1.

When the reading of the file F1 progresses further, and the opening tag <drug efficacy> is read, because the subsequent data has the "drug efficacy" attribute, the value of the number "1" bit corresponding to the drug efficacy tag changes from "0" to "1". The state information S1 is thereby updated to the state information S2. Since the values of the bits of both the number "0" that corresponds to the symptom tag and the number "1" that corresponds to the drug efficacy tag in the state information S2 are "1", it is indicated that the character information "develop fever" that is read next has the "symptom" and "drug efficacy" attributes. For each of the character information items of "develop" and "fever", an update of the full-text search index is carried out based on the "symptom" and "drug efficacy" attributes.

When the reading of the file F1 progresses further, and the closing tag </drug efficacy> is read, because the subsequent data does not have the "drug efficacy" attribute, the value of the number "1" bit corresponding to the drug efficacy tag changes from "1" to "0". The state information S2 is thereby updated to the state information S3.

When the reading of the file F1 progresses further, and the opening tag <side effect> is read, because the subsequent data has the "side effect" attribute, the value of the number "2" bit corresponding to the side effect tag changes from "0" to "1". The state information S3 is thereby updated to the state information S4. Furthermore, when the closing tag </side effect> is read, because the subsequent data does not have the "side effect" attribute, the value of the number "2" bit corresponding to the side effect tag changes from "1" to "0". The state information S4 is thereby updated to the state information S5.

In addition, when the closing tag </symptom> is read, because the subsequent data does not have the "symptom" attribute, the value of the number "0" bit corresponding to the symptom tag changes from "1" to "0". The state information S5 is thereby updated to the state information S6.

All of the state information S1 to S5 indicates that the character information that has been read has the "symptom" attribute. Furthermore, the character information that has been read in the state of the state information S2 has both the "symptom" and "drug efficacy" attributes. When the character information is read in the state of the state information S2, an update of the full-text search index based on the "symptom" attribute, and an update of the full-text search index based on the "drug efficacy" attribute are both carried out.

Figure 4:
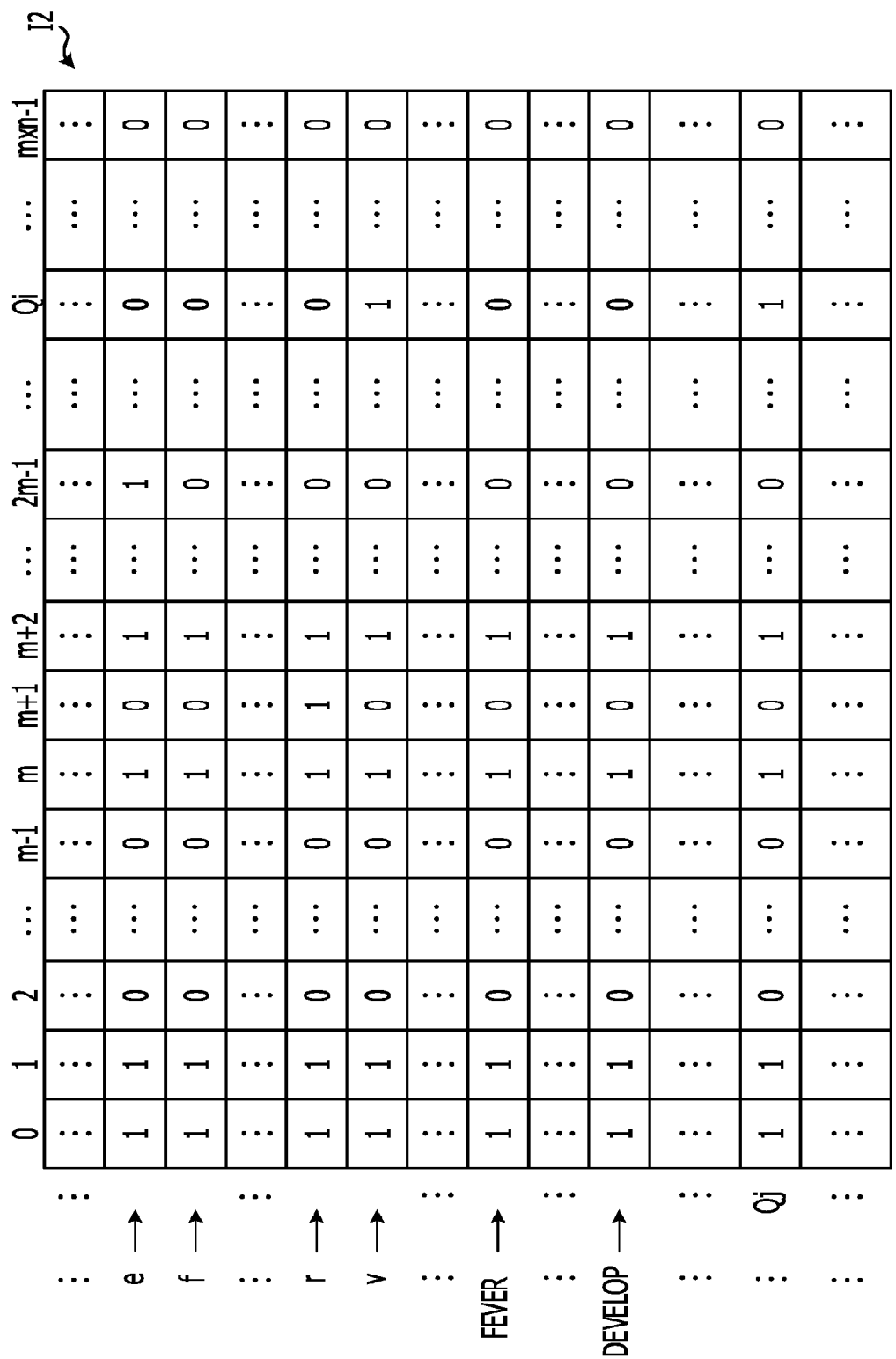
FIG. 4 depicts an example of a full-text search index.

FIG. 4 depicts an example of a full-text search index. The full-text search index I2 exemplified in FIG. 4 includes m×n columns corresponding to each combination of the m types of tags indicated in the files F1 to Fn and the state information S. Furthermore, the full-text search index I2 includes a number k1 of rows of character information that have been set as character information to be used for narrowing down in the full-text search index I2.

An m number of bit columns are allocated to the files, and, for example, the 0 to m−1 bit columns correspond to the file F1. Furthermore, for example, the bit column denoted by 0 is allocated to tag number "0" (the symptom tag) of the file F1. Furthermore, the bit column denoted by 1 is allocated to tag number "1" (the drug efficacy tag) of the file F1. Furthermore, the bit column denoted by m is allocated to tag number "0" (the symptom tag) of the file F2. In other words, the character information of the file F1 is indicated by the 0 to m−1 bit columns, and the character information of data units corresponding to the combination of the file F1 and the symptom tag is indicated in the bit column denoted by 0.

The coordinate Qi, which designates a column in the full-text search index I2, is calculated by using the calculation formula of Qi=(file number)×m+(tag number). In the full-text search index I2, even in the case of character information included in the same file, an update is carried out with respect to different bit columns in accordance with the tag indicated by the state information S.

Meanwhile, in a first example of the generation of the full-text search index I2, the coordinate Qj is calculated using a hash function (Hash1). By using a character code indicating character information that has been read for an argument in the hash function (Hash1), the coordinate Qj is calculated by Qj=Hash1(character information), for example.

Furthermore, in a second example of the generation of the full-text search index I2, an offset value associated with character information in a conversion table T1 is used as the coordinate Qj. The details of the conversion table T1 are described hereafter based on FIG. 6. The conversion table T1 is referred based on character information that has been read, and an offset value is read.

By using the method indicated in the first example or the second example previously described, the coordinate Qj, which corresponds to character information that has been read, is calculated and combined with the coordinate Qi, and a bit location Q corresponding to the character information is specified. In addition, the bit in the specified location Q is updated.

When search targets are narrowed down, bit rows corresponding to the character information included in a search character string are acquired from the full-text search index I2. A logical product calculation is carried out with the acquired bit rows for example, and bits that correspond to tags designated as search targets are referred to from the bit columns resulting from the logical product calculation. In other words, corresponding file numbers are output with respect to bits that correspond to the coordinate Qi=(file number)×m+(designated tag number) and have a value of "1" in the bit row resulting from the logical product calculation. The files corresponding to the output file numbers become search-target files.

FIG. 5 depicts an example of a full-text search index. The full-text search index I3 exemplified in FIG. 5 is configured from n columns corresponding to files, and rows corresponding to combinations of character information and tags that are able to be designated as search targets. Each of the files F1 to Fn corresponds to the 0 to n−1 bit columns. The coordinate Qi in the full-text search index I3 is indicated by Qi=(file number).

When the number of character information items set in the full-text search index I3 is taken as k2, m×k2 rows of bit rows are included in the full-text search index I3. The calculation of the coordinate Qj corresponding to a combination of character information and a tag is carried out, for example, as in the following three examples.

In a first example of the generation of the full-text search index I3, the coordinate Qj is calculated using a hash function (Hash2) that returns values from 0 to k2−1. The coordinate Qj is, for example, calculated by Qj=Hash2 (character information)+(tag number)×k2.

Furthermore, in a second example of the generation of the full-text search index I3, a conversion table T2 in which character information and offset values in the full-text search index I3 are associated is used in the calculation of the coordinate Qj. The details of the conversion table T2 are described hereafter using FIG. 7. A coordinate Qj corresponding to character information and a tag is, for example, calculated by Qj=(offset value associated with character information in the conversion table T2)+(tag number)×k2. In this case, bit rows in which k2 types of common character information are combined are included for each tag in the full-text search index I3.

Furthermore, in a third example of the generation of the full-text search index I3, a conversion table T3 in which combinations of character information and tags are associated with offset values in the full-text search index I3 is used in the calculation of the coordinate Qj. The details of the conversion table T3 are described hereafter using FIG. 8. The offset values associated in the conversion table T3 with the combinations of character information and tags are used for the coordinate Qj.

When the character information is read in the generation of the full-text search index I3, the coordinate Qj is calculated based on that character information and the attributes of the character information, and, in addition, the coordinate Qi is decided in accordance with the file number of the file originally read. The full-text search index I3 is generated by sequentially updating the location Q constituted by the coordinate Qi and the coordinate Qj, in accordance with the reading of character information that is sequentially carried out for each of the files F1 to Fn.

When search targets are narrowed down, bit rows corresponding to combinations of the character information and tags included in the search character string are acquired from the full-text search index I3. A logical product calculation is carried out with the acquired bit rows for example, and the file numbers corresponding to the bits having a value of "1" are output from among the bit columns resulting from the logical product calculation. The files corresponding to the output file numbers become search-target files.

FIG. 6 depicts an example of the conversion table T1. The conversion table T1 exemplified in FIG. 6 includes character information (for example, "develop", "fever", "f", "e", "v", and "r" and so forth) used as conditions for narrowing down search targets in the full-text search index I2. Offset values in the full-text search index I2 are associated with the character information included in the conversion table T1.

FIG. 7 depicts an example of the conversion table T2. The conversion table T2 exemplified in FIG. 7 includes character information used as conditions for narrowing down search targets in the full-text search index I3. In the narrowing down of search targets using the conversion table T2, combinations with common character information groups (two types) are prepared for the tags. Thus, the correspondence between the character information and the offset values in the full-text search index I3 is indicated in the conversion table T2. Row numbers from among a plurality of bit rows relating to a tag are indicated by the offset values included in the conversion table T2.

The conversion table T1 depicted in FIG. 6 may be used for the generation of the full-text search index I3. In contrast to the size of the full-text search index I2 being n×m×k1, the size of the full-text search index I3 is n×m×k2. When the conversion table T1 depicted in FIG. 6 is used for the generation of the full-text search index I3, a full-text search index having the same size as the full-text search index I2 is generated.

However, because the full-text search index I2 and the full-text search index I3 are full-text search indexes that correspond to attributes, the size becomes greater than an ordinary full-text search index in accordance with the number m of tags.

FIG. 8 depicts an example of the conversion table T3. The conversion table T3 exemplified in FIG. 8 includes combinations of character information and tags that are used as conditions for narrowing down search targets in the full-text search index I3. In the conversion table T3, it is possible for tags to be individually combined with character information groups. For example, combinations of the symptom tag and character information such as "develop" and "fever" are included in the conversion table T3. Combinations of the gender tag and character information such as "male" and "female" are included in the conversion table T3; however, combinations of the gender tag and character information such as "develop" and "fever" are not included.

The size of the full-text search index I3 that is generated using the conversion table T3 is n×m×kx. This kx is the average value of the character information in the attributes. If the number of character information items is to be reduced by using the attributes, the size of the full-text search index I3 may be reduced by using the conversion table T3.

In the full-text search index I2 or the full-text search index I3 previously described, the bits in the full-text search index are updated in accordance with the state information S in the read location. Even if tags have a nested structure, it is possible for the state information S to indicate being within the scope of both a higher-level tag and a lower-level tag, and therefore the bits relating to both the higher-level tag and the lower-level tag are updated. Due to such updating of bits being carried out, a full-text search index in which it is possible to use either of the higher-level tag or the lower-level tag as a condition for narrowing down search targets is generated.

Configuration and Processing Procedure

Figure 9:
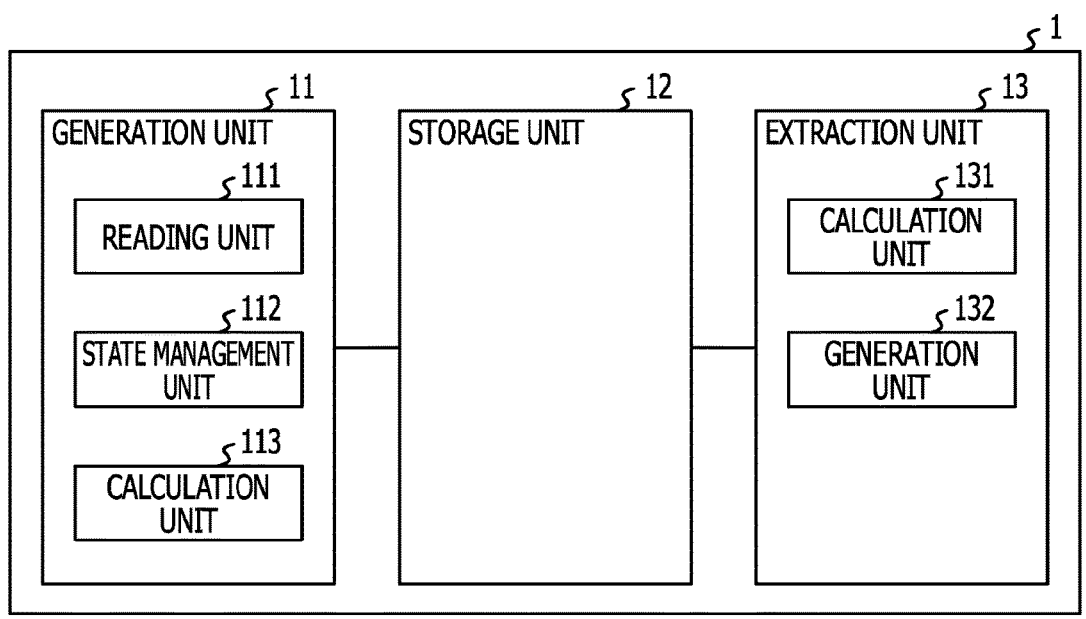
FIG. 9 depicts an example functional block configuration.

FIG. 9 depicts an example functional block configuration. A computer 1 exemplified in FIG. 9 includes a generation unit 11, a storage unit 12, and an extraction unit 13. The generation unit 11 is a function block that generates a full-text search index, and includes a reading unit 111, a state management unit 112, and a calculation unit 113. The storage unit 12 is a function block that stores the files F1 to Fn and a full-text search index generated by the generation unit 11, and is provided with a storage region that is used as a work area for the generation unit 11 and the extraction unit 13. The extraction unit 13 is a function block that uses the full-text search index (the full-text search index I2 or the full-text search index I3) stored in the storage unit 12 to narrow down search-target files.

The reading unit 111 sequentially reads the files F1 to Fn. In the reading of the files, the reading unit 111 sequentially reads header portions in the files and data portions excluding footer portions. The state management unit 112 manages the state information S in accordance with the reading performed by the reading unit 111. As exemplified in FIG. 3, the state management unit 112 updates the state information S in accordance with the reading of opening tags and closing tags by the reading unit 111. The calculation unit 113 calculates an updated location Q in the full-text search index in accordance with the reading of character information by the reading unit 111. The calculation unit 113 calculates the location Q by the method previously described, based on the file number of the file being read by the reading unit 111, the number of the tag indicated by the state information S, and the character information that has been read by the reading unit 111. At such time, if the state information S indicates a plurality of attributes, the calculation unit 113 calculates a plurality of locations Q, based on each of the attributes. In addition, if a plurality of locations Q are calculated by the calculation unit 113, the generation unit 11 updates each of the locations Q in the full-text search index.

A calculation unit 131 calculates information that specifies a bit group in the full-text search index, based on character information included in a search character string, and a tag specified as a search condition. In the full-text search index I2, the calculation unit 131 specifies a bit row and the location of a bit relating to a specified tag in the bit row. In the full-text search index I3, the calculation unit 131 specifies a bit row. If the state information S indicates a plurality of attributes, the calculation unit 131 specifies a corresponding bit group for each of the attributes. Based on the bit group specified by the calculation unit 131, a generation unit 132 narrows down the search-target files, and generates a list of the file numbers of the files narrowed down.

In addition, the computer 1 may include a search unit that searches the files included in the list generated by the generation unit 132, based on the search character string and the tag designated as search conditions.

Figure 10:
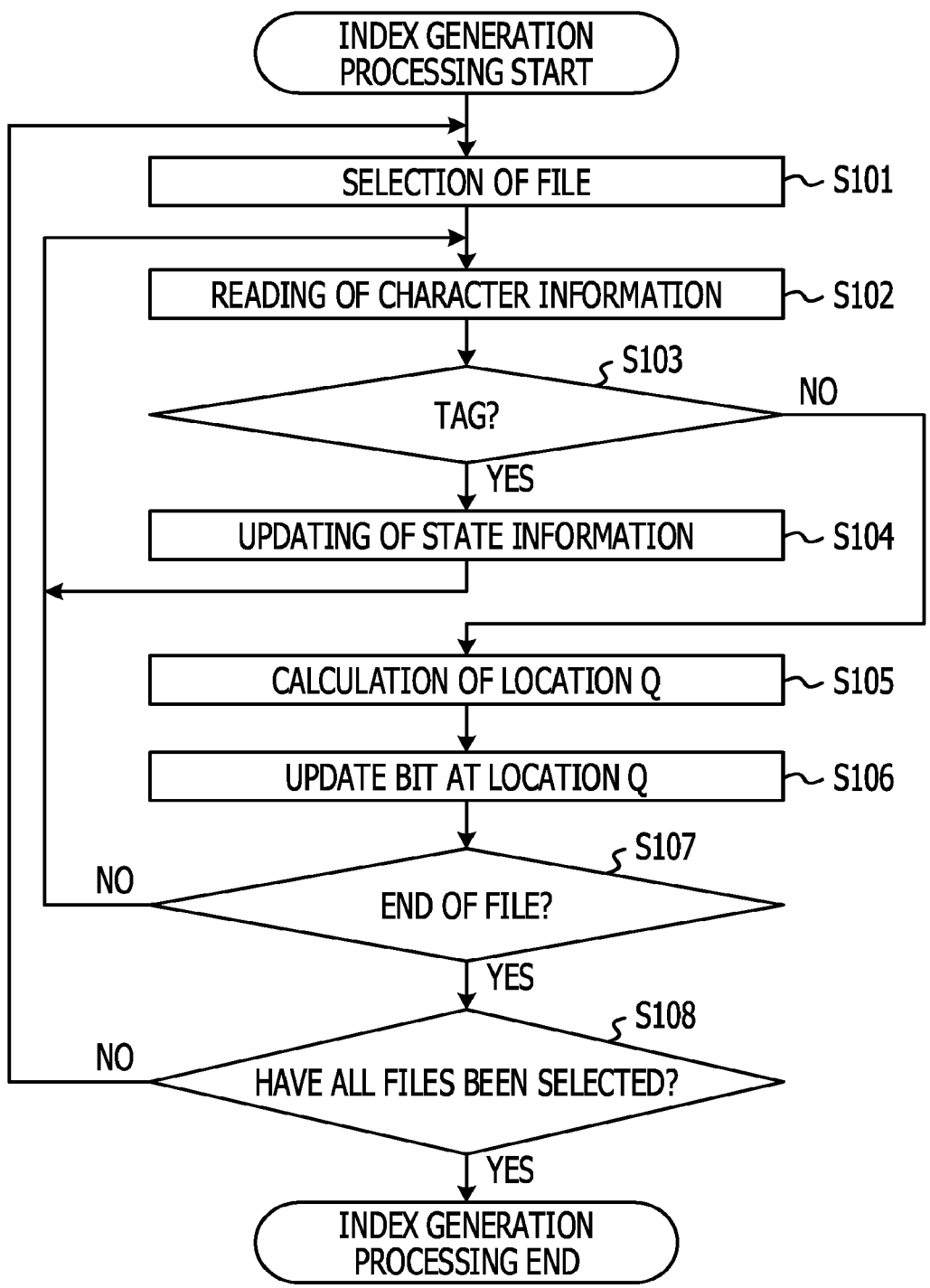
FIG. 10 depicts an example procedure for index generation processing.

FIG. 10 depicts an example procedure for index generation processing. When the generation unit 11 receives an instruction to generate a full-text search index for the files F1 to Fn included in the storage unit 12, the reading unit 111 selects one file from the files F1 to Fn (S101). For example, if file numbers have been allocated to the files F1 to Fn as previously described, the files are sequentially selected from the file having the lowest file number. Next, the reading unit 111 reads character information from the file selected in S101 (S102). The reading unit 111 retains the file number of the file being read, and information indicating the read location in the file. In the processing of S102, the reading unit 111 carries out reading based on the file number and the read location retained, and updates the reading location in accordance with the data length of the character information that has been read.

The generation unit 11 determines whether or not the character information read in S102 is a tag (S103). If the character information read in S102 is a tag (S103: YES), the state management unit 112 updates the state information S (S104). If the tag read in S102 is an opening tag, the value of the bit corresponding to the tag is set to "1", and if the tag is a closing tag, the value of the bit corresponding to the tag is set to "0". When the state management unit 112 updates the state information S, processing moves to the procedure of S102, and character information is read by the reading unit 111.

If the character information read in S102 is not a tag (S103: NO), the calculation unit 113 calculates the location Q (S105). Next, the generation unit 11 updates the value of the bit at the location Q calculated by the calculation unit 113 in S105 to "1" (S106). When S106 finishes, the reading unit 111 determines whether or not the read location is at the end of the data portion of the file (S107). If the read location is not at the end of the data portion of the file (S107: NO), processing moves to the procedure of S102, and character information is read by the reading unit 111.

Furthermore, if the read location is at the end of the file (S107: YES), the reading unit 111 determines whether or not all of the files F1 to Fn have been selected by processing S101 (S108). If an unselected file is included in the files F1 to Fn (S108: NO), the procedure moves to S101, and the file is selected by the reading unit 111. If all of the files F1 to Fn have been selected (S108: YES), the generation unit 11 stores the full-text search index in the storage unit 12, and the index generation processing ends.

Figure 11:
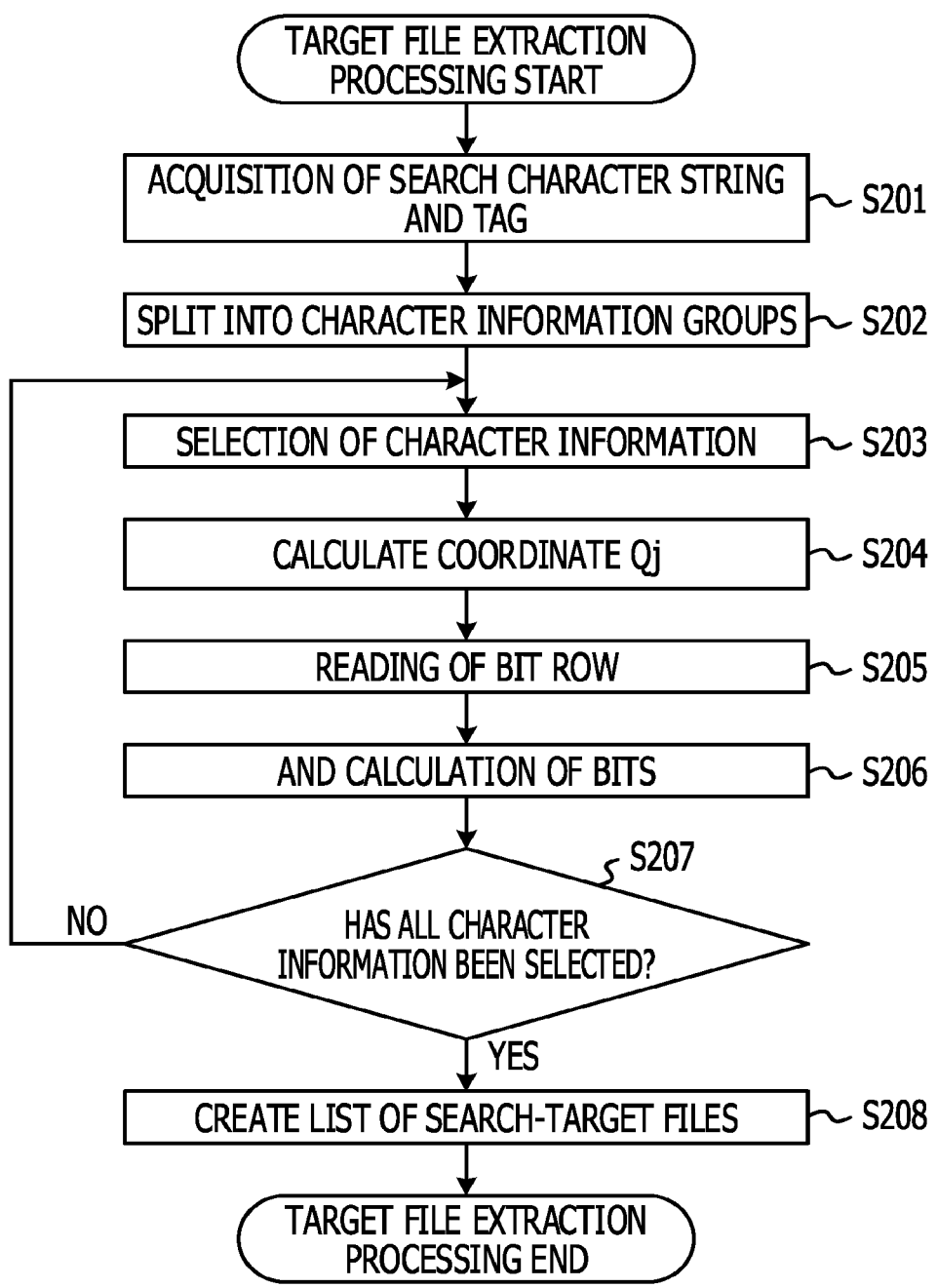
FIG. 11 depicts an example procedure for target file extraction processing.

FIG. 11 depicts an example procedure for target file extraction processing. When a search character string and a tag are designated as search conditions for a search carried out with respect to the files F1 to Fn, target file extraction processing starts. First, the extraction unit 13 acquires the designated search character string and the tag (S201). Next, the extraction unit 13 splits the search character string into a plurality of character information items (S202). For example, if a search character string such as "develop fever" is designated, the search character string is split into character information such as "develop" and "fever".

The calculation unit 131 selects one item of character information from the split character information (S203). In addition, the calculation unit 131 calculates a coordinate Qj, based on the character information selected in S203 (S204). The method for calculating the coordinate Qj is as previously described. As in the full-text search index I2, if information relating to a plurality of attributes is included in the bit row at the coordinate Qj, in S204, the calculation unit 131 additionally calculates the location of a bit group relating to an attribute included in the search condition. Specifically, as previously described, the locations of bits are indicated by the coordinate Qi=(file number)×m+(designated tag number).

When the coordinate Qj is generated by the calculation unit 131, the generation unit 132 reads the bit row, based on the coordinate Qj (S205). If the reading of the bit row in S205 is the first time that reading is performed, the bit row that is read in S205 is retained as it is by the generation unit 132, and if it is not the first time, a logical product calculation is carried out with a bit row retained in the past and the bit row read in the immediately preceding S205, and the bit row obtained as a result thereof is retained (S206). If the full-text search index I2 is used, the generation unit 132 carries out the calculation of S206 using a bit column configured by extracting only the bits at the locations of the bits specified in S204.

Next, the generation unit 132 determines whether or not there is unselected character information among the plurality of character information items split in S202 (S207). If there is unselected character information (S207: NO), the procedure moves to S203, and character information is selected by the calculation unit 131.

If the generation unit 132 has determined that all of the plurality of character information items split in S202 have been selected (S207: YES), the generation unit 132 generates a list of file numbers indicated by the bit columns retained in the generation unit 132 (S208). The files having numbers that are indicated in the list generated in S208 become search-target files. When the processing of S208 finishes, the target file extraction processing ends.

Compression of a Full-Text Search Index

In the full-text search indexes depicted in FIG. 4 and FIG. 5, data size increases and decreases due to the number of types of character information, the number of files, and the number of types of tags. Furthermore, according to the embodiment previously described, a coordinate Qj that indicates a bit row in a full-text search index is calculated using a hash function for example. For example, in the full-text search index I2 depicted in FIG. 4, each hash value for which k1 types of character information serve as arguments indicates a separate coordinate Qj, and, as a result, bit rows that individually indicate whether or not each of the character information items exists are generated. Furthermore, in the full-text search index I3 depicted in FIG. 5, each hash value for which k2 types of character information serve as arguments indicates a separate coordinate Qj, and, as a result, bit rows that individually indicate whether or not each of the character information items exists are generated.

Therefore, for example, a hash function (Hash3) that returns a value of a number k3 that is less than the number k1 of character information used in the full-text search index I2 is used instead of the hash function (Hash1). The hash function (Hash3), for example, uses character information as an argument and returns a value from 0 to k3−1. In such case, because the number of rows included in the full-text search index is less than in the full-text search index I2, the data size of the full-text search index is less than that of the full-text search index I2. In this case, because the types of values returned by the hash function (Hash3) are less than the types of character information, the hash values are the same for some of the character information. In this case, the bits included in the bit row at the coordinate Qj indicate whether or not any of a plurality of character information items that are arguments for the same hash value Qj are included.

Furthermore, the full-text search index I3 is also compressed in the same manner. For example, a hash function (Hash4) that returns a value of a number k4 that is less than k2×m is used instead of the hash function (Hash2). The hash function (Hash4), for example, uses a tag and character information as arguments and returns a value from 0 to k4−1. In such case, because the number of rows included in the full-text search index is less than in the full-text search index I3, the data size of the full-text search index is less than that of the full-text search index I3.

The compression of the full-text search index I3 depicted in FIG. 5 is described Hereafter. When the full-text search index I2 depicted in FIG. 4 is compressed, all that have to be done is for the arguments of the hash function to be changed from the two variables of the tag and the character information to the one variable of only the character information.

Figure 12:
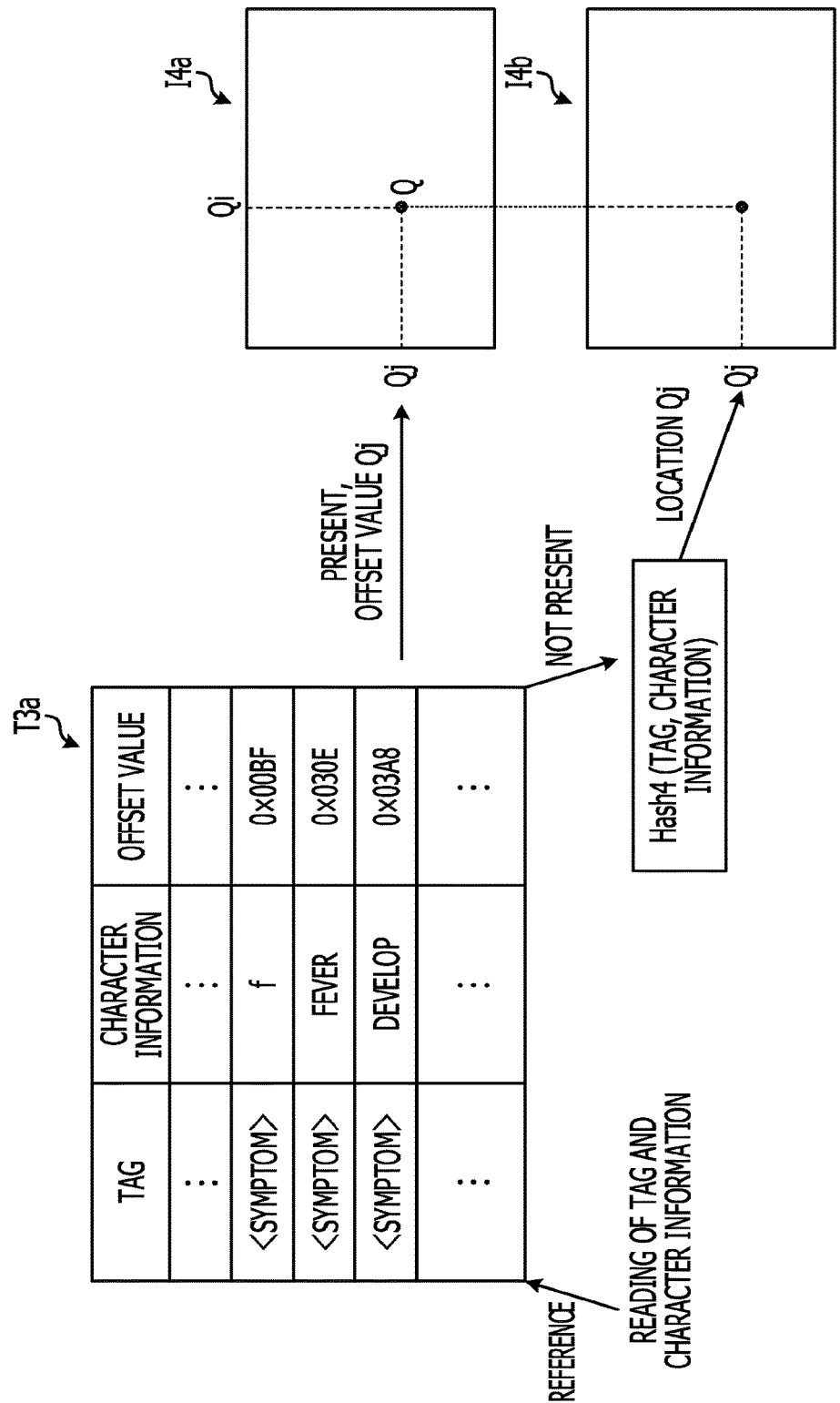
FIG. 12 depicts an example for generating a compressed full-text search index.

FIG. 12 depicts an example for generating a compressed full-text search index. In the generation example of FIG. 12, different full-text search indexes are updated in accordance with whether or not the combination of the character information that has been read from a file and a tag that applies an attribute to that character information is registered in a conversion table T3a. In other words, a full-text search index I4a is updated when a combination of a tag and character information that is registered in the conversion table T3a is read, and a full-text search index I4b is updated when a combination of a tag and character information that is not registered in the conversion table T3a is read.

For example, combinations of character information and tags having a high appearance frequency (many "1" values in the corresponding bit row) are registered in the conversion table T3a. Furthermore, in the conversion table T3a, different offset values are associated with each of the registered combinations of character information and tags. In other words, the offset values associated with the combinations of character information and tags registered in the conversion table T3a indicate a coordinate Qj of one bit row in the full-text search index I4a. The number of rows of the full-text search index I4a is k5a.

Meanwhile, with regard to the character information and tags that are not registered in the conversion table T3a, a coordinate Qj in the full-text search index I3 is calculated by using a hash function (Hash5) in which character information and a tag serve as arguments. The hash function (Hash5) returns a value of a number k5b that is less than k2×m−k5a.

While the number of combinations of character information and tags not registered in the conversion table T3$a$ is k2×m−k5$a$, there are fewer types of hash values of the hash function (Hash5). Thus, some of the combinations not registered in the conversion table T3$a$ are associated with the bit row of the same coordinate Qj. The full-text search index I4$b$ thereby assumes a compressed state.

In the generation example of FIG. 12, in accordance with the frequency of a combination of character information and a tag, switching is performed between whether to update an uncompressed full-text search index or whether to update a compressed full-text search index. Many bits having a value of "1" are included in bit rows corresponding to combinations that appear at a high frequency. With regard to character information having a high frequency, there is a tendency for the value of the logical product to be "1" when the logical product of a bit row corresponding to character information included in a search character string is calculated. Thus, if character information C1 having a high frequency is associated with the same bit row as other character information C2, when search-target files are narrowed down by using the character information C2, the possibility of a file that does not contain the character information C2 but does contain the character information C1 becoming a search target increases. Thus, by compressing the full-text search index excluding character information having a high appearance frequency, it is possible for noise in the narrowing down of search targets to be reduced, and for the data size of a full-text search index to be reduced by using character information that is unlikely to cause narrowing-down noise.

Implementation of the Present Embodiment

An implementation of the previously described search processing and the full-text search index generation processing is described hereafter.

Figure 13:
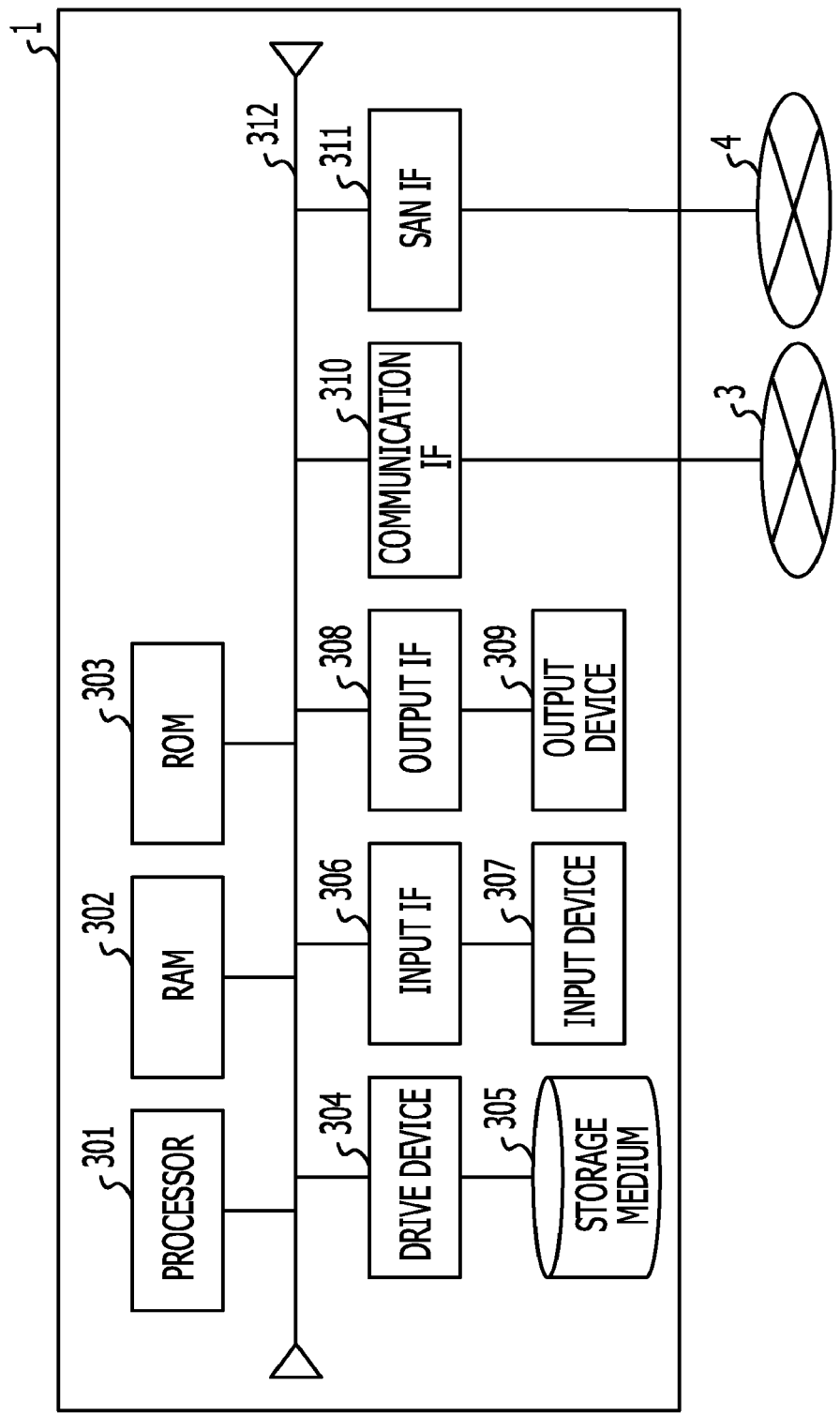
FIG. 13 depicts an example hardware configuration of a computer.

FIG. 13 depicts an example hardware configuration of the computer 1. The computer 1, for example, includes a processor 301, a random-access memory (RAM) 302, a read-only memory (ROM) 303, a drive device 304, a storage medium 305, an input interface (IF) 306, an input device 307, an output interface (IF) 308, an output device 309, a communication interface (IF) 310, a storage area network (SAN) interface (IF) 311, and a bus 312 and so forth. Each item of hardware is connected via the bus 312.

The RAM 302 is a readable and writable memory device, and, for example, a semiconductor memory such as a static random-access memory (SRAM) and a dynamic random-access memory (DRAM), or, other than RAM, a flash memory or the like may be used. The ROM 303 may be a programmable read-only memory (PROM) or the like. The drive device 304 is a device that carries out at least either one of the reading or the writing of information recorded on the storage medium 305. The storage medium 305 stores information that is written by the drive device 304. The storage medium 305, for example, is a storage medium such as a hard disk, a flash memory such as a solid state drive (SSD), a compact disc (CD), a digital versatile disc (DVD), and a Blu-ray Disc. Furthermore, for example, the computer 1 is provided with a drive device 304 and a storage medium 305 for each of a plurality of types of storage media.

The input interface 306 is a circuit that is connected to the input device 307, and transmits, to the processor 301, an input signal received from the input device 307. The output interface 308 is a circuit that is connected to the output device 309, and executes output corresponding to an instruction of the processor 301, to the output device 309. The communication interface 310 is a circuit that executes communication via a network 3 in a wired or wireless manner. The communication interface 310 is a network interface card (NIC) for example. The SAN interface 311 is a circuit that controls communication with storage devices connected to the computer 1 by using a storage area network 4. The SAN interface 311 is a host bus adapter (HBA) for example.

The input device 307 is a device that transmits input signals in accordance with an operation. The input signals are, for example, from key devices such as a keyboard and buttons attached to the main body of the computer 1, and pointing devices such as a mouse and a touch panel. The output device 309 is a device that outputs information in accordance with the control of the computer 1. The output device 309, for example, is an image output device (display device) such as a display, or an audio output device such as a speaker. Furthermore, for example, an input/output device such as a touchscreen may be used as the input device 307 and the output device 309. Furthermore, the input device 307 and the output device 309 may be integrally formed with the computer 1, and may be devices that are not included in the computer 1, and, for example, connect to the computer 1 from outside in a wired or wireless manner.

For example, the processor 301 reads a program stored in the ROM 303 or the storage medium 305 into the RAM 302, and performs at least one of the processing of the generation unit 11 and the extraction unit 13 in accordance with the procedure of the program that has been read. At such time, the RAM 302 is used as a work area for the processor 301. The functionality of the storage unit 12 is implemented by the ROM 303 and the storage medium 305 storing a program file (an application program 24, middleware 23, and an OS 22 and so forth described hereafter) and data files (files F1 to Fn and so forth), and the RAM 302 being used as a work area for the processor 301. The program read by the processor 301 is described using FIG. 14.

Figure 14:
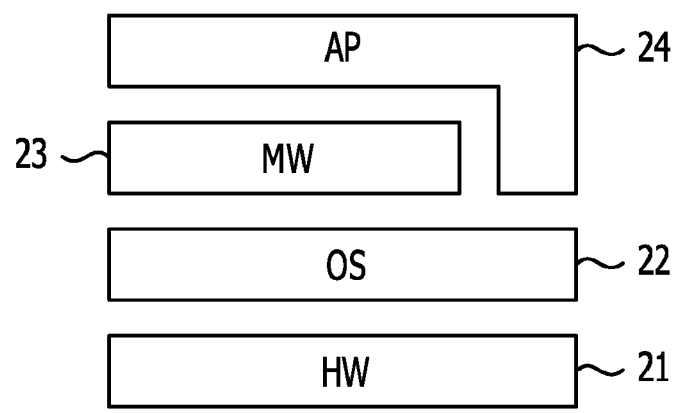
FIG. 14 depicts an example configuration of a program operated on a computer.

FIG. 14 depicts an example configuration of a program operated on the computer 1. The application program 24 or the middleware 23 is a program in which the processing procedure for the full-text search index generation function of the present embodiment or the search-target file narrowing-down function in which a full-text search index is used is defined. A generation program in which the processing procedure for the full-text search index generation function is defined, and a search control program in which the processing procedure for the search-target file narrowing-down function in which a full-text search index is used is defined may be a single program, or may be separate programs. Alternatively, at least one of the generation function and the narrowing-down function of the present embodiment may be provided as one function of the operating system (OS) 22.

For example, at least one of the generation program and the search control program, indicating the processing procedure for at least one of the generation function and the narrowing-down function previously described, is stored on a storage medium. For example, this storage medium is read and installed by the drive device 304, and the program stored on the storage medium thereby becomes executable. The installed program is sequentially read into the RAM 302, and the processing procedure defined in the program read into the RAM 302 is sequentially executed by the processor 301.

The functionality of the function blocks included in the computer 1 depicted in FIG. 9 are provided by the processor 301 executing the generation program or the search control program. The functionality of the generation unit 11 and the function blocks included in the generation unit 11 is provided by the processing procedure depicted in FIG. 10 being executed by the processor 301. Furthermore, the functionality of the extraction unit 13 and the function blocks included in the extraction unit 13 is provided by the processing procedure depicted in FIG. 11 being executed by the processor 301.

For example, the function blocks in the generation unit 11 are executed by using a hardware group 21 as follows. The functionality of the reading unit 111 is provided by the processor 301 managing the processing state (the read location in the RAM 302 and so forth) in a register, and accessing inside the RAM 302 in accordance with the managed processing state. The functionality of the state management unit 112 is implemented by the processor 301 carrying out collation processing with respect to data read from the RAM 302, and updating the state information managed by the register, in accordance with the collation result. The functionality of the calculation unit 113 is implemented by calculation processing based on data read from the RAM 302 being carried out.

For example, the function blocks in the extraction unit 13 are executed by using the hardware group 21 as follows. The functionality of the calculation unit 131 is implemented by the processor 301 calculating an access location in the RAM 302, and accessing the calculated access location and carrying out calculation processing with respect to the data that has been read. Furthermore, the functionality of the generation unit 132 is implemented by the processor 301 writing data in the RAM 302, based on the calculation result.

According to the present embodiment, state information that indicates data attributes is appropriately updated in accordance with the reading of tags from files F1 to Fn, and therefore the tags that apply attributes to data at a read location are indicated by the state information. Thus, configuration information that indicates the configuration of character information present within the scope of a tag is generated for both tags having a nested structure. In this way, because configuration information corresponding to tags is generated, if a tag is designated as a search condition and a search is carried out, it becomes possible to determine whether or not the character information of the search character string is included in the scope of the tag by referring to the configuration information corresponding to the tag. Thus, situations (noise in narrowing down) in which the character information of the search character string is included outside the scope of the tag and so forth, and files and so forth that do not correspond to the search condition relating to the tag become search targets are suppressed. Thus, in the search processing, because the number of files that are loaded is reduced, the number of times that I/O is performed by the storage device (the storage medium 305 for example) that stores the files and the number of times that calculations are performed by the processor 301 are reduced.

Figure 15:
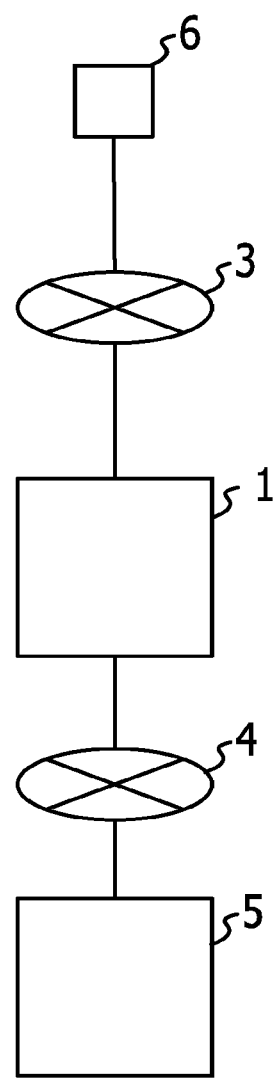
FIG. 15 depicts an example system configuration in which a computer is used.

FIG. 15 depicts an example system configuration in which the computer 1 is used. The information processing system exemplified in FIG. 15 includes the computer 1, the network 3, a client device 6, the storage area network (SAN) 4, and a storage device 5. For example, the computer 1 carries out search processing corresponding to a request from the client device 6. The files F1 to Fn are compressed and stored in the storage device 5 for example. If the computer 1 has received a request from the client device 6, the computer 1 narrows down search-target files from the files F1 to Fn that have been compressed and stored in the storage device 5. In addition, the computer 1 decompresses the search-target files that have been narrowed down, and performs search processing based on the conditions requested from the client device 6 with respect to the decompressed files.

In the system exemplified in FIG. 15, data decompression is carried out every time a search request is received. If the decompression processing takes time, the time until a response to the request also increases. According to the search-target narrowing-down function of the present embodiment, the unnecessary implementation of decompression processing with respect to files is reduced. Furthermore, the storage region that is ensured for the loading of compressed files is reduced.

Screen Provided to the User

Figure 16:
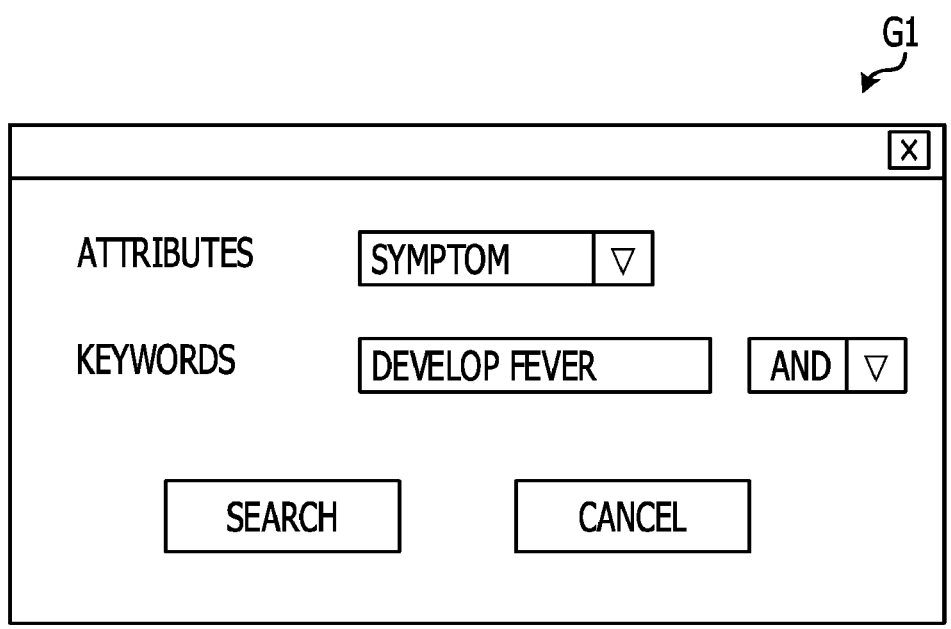
FIG. 16 depicts an example of an input screen.

FIG. 16 depicts an example of an input screen. A screen G1 exemplified in FIG. 16 displays an attribute input field, a keyword input field, a logical operator designation field, a search execution button, and a cancel button.

The user who inputs a search condition, for example, selects an attribute that the user wishes to designate as a search condition from a pull-down menu provided in the attribute input field. For example, attributes corresponding to each of the m types of tags set in a full-text search index are set in the pull down menu. When an attribute is set, the tag corresponding to the attribute is set as a search condition. Furthermore, the user inputs a keyword into the keyword input field. The input keyword is set as a search condition. If a plurality of keywords have been input, a logical expression in which the keywords are linked by the logical operator designated in the logical operator designation field is set as a search condition. The logical operator designation field is, for example, a pull-down menu in which the logical product calculation operator "AND" and the logical sum calculation operator "OR" and so forth are able to be selected.

When an input operation is carried out with respect to the search execution button, a search request that designates search conditions based on the content input to the attribute input field, the keyword input field, and the logical operator designation field is transmitted to the computer 1. When an input to the cancel button is carried out, an operation that closes the screen G1 is carried out.

Description of Modified Example

Design changes to the previously described embodiment may be carried out as appropriate without deviating from the purpose of the present technology. For example, the "0" and "1" values in the full-text search indexes I1 to I3, I4a, and I4b may be reversed. Furthermore, even if not expressed by "0" and "1", it is acceptable as long as mutually identifiable values are used instead of "0" and "1". Furthermore, the rows and columns in the full-text search indexes I1 to I3, I4a, and I4b may be reversed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
circuitry configured to:
receive a search request that includes a certain character string and tags for designating a certain attribute related to the certain character string;
split the certain character string into a plurality of character information;
calculate a coordinate indicating a location in a search index for each of the plurality of character information, the search index including for each of a plurality of files, configuration information that indicates a configuration of character information included in the files;
acquire, for each of the plurality of character information, a bit column from the search index based on the calculated coordinate;
extract one or more files from the plurality of files based on file numbers corresponding to the acquired bit columns; and
output information indicating the extracted one or more files as a response to the search request.

2. The system of claim 1, wherein when first character information included in a first file among the plurality of files is related to a plurality of attributes, existence information is included in the first file for each of the plurality of attributes, the existence information including information indicating that a combination of the first character information and an attribute among the plurality of attributes relating to the first character information.

3. The system of claim 1, wherein an attribute is related to one or more character information included in the plurality of files by a tag in a predetermined form.

4. The system of claim 1, wherein the character information includes at least one of a character or a plurality of characters.

5. The system of claim 1, wherein existence information includes a bitmap including one or more rows and bits indicated by a plurality of columns for a row, each of the one or more rows corresponding to each combination of the character information and an attribute relating to the character information, each of the plurality of columns corresponding to each of the plurality of files for each of the one or more rows, and each value of the bits indicating whether or not a combination corresponding to a row exists in each file in the plurality of files corresponding to each column in the plurality of columns.

6. The system of claim 5, wherein based on a frequency of one or more files including the combination of the character information and the attribute relating to the character information for the plurality of files, the existence information includes a row including the bits where each bit corresponding to each of a plurality of combinations is calculated by a logical product.

7. A method comprising:
receiving a search request that includes a certain character string and tags for designating a certain attribute related to the certain character string;
splitting the certain character string into a plurality of character information;
calculating a coordinate indicating a location in a search index for each of the plurality of character information, the search index including, for each of a plurality of files, configuration information that indicates a configuration of character information included in the files;
acquiring, for each of the plurality of character information, a bit column from the search index based on the calculated coordinate;
extracting, from among the plurality of files, one or more files from the plurality of files based on file numbers corresponding to the acquired bit columns; and
outputting, by circuitry, information indicating the extracted one or more files as a response to the search request.

8. The method of claim 7, wherein when first character information included in a first file among the plurality of files is related to a plurality of attributes, existence information is included in the first file for each of the plurality of attributes, the existence information including information indicating that a combination of the first character information and an attribute among the plurality of attributes relating to the first character information.

9. The method of claim 7, wherein an attribute is related to one or more character information included in the plurality of files by a tag in a predetermined form.

10. The method of claim 7, wherein the character information includes at least one of a character or a plurality of characters.

11. The method of claim 7, wherein existence information includes a bitmap including one or more rows and bits indicated by a plurality of columns for a row, each of the one or more rows corresponding to each combination of the character information and an attribute relating to the character information, each of the plurality of columns corresponding to each of the plurality of files for each of the one or more rows, and each value of the bits indicating whether or not a combination corresponding to a row exists in each file in the plurality of files corresponding to each column in the plurality of columns.

12. The method of claim 11, wherein based on a frequency of one or more files including the combination of the character information and the attribute relating to the character information for the plurality of files, the existence information includes a row including the bits where each bit corresponding to each of a plurality of combinations is calculated by a logical product.

13. A non-transitory computer-readable medium including a program, which when executed by a system, causes the system to:
receive a search request that includes a certain character string and tags for designating a certain attribute related to the certain character string;
split the certain character string into a plurality of character information;
calculate a coordinate indicating a location in a search index for each of the plurality of character information, the search index including, for each of a plurality of files, configuration information that indicates a configuration of character information included in the files;
acquire, for each of the plurality of character information, a bit column from the search index based on the calculated coordinate;
extract one or more files from the plurality of files based on file numbers corresponding to the acquired bit columns; and
output, by circuitry, information indicating the extracted one or more files as a response to the search request.

14. The non-transitory computer-readable medium of claim 13, wherein when first character information included in a first file among the plurality of files is related to a plurality of attributes, existence information is included in the first file for each of the plurality of attributes, the existence information including information indicating that a combination of the first character information and an attribute among the plurality of attributes relating to the first character information.

15. The non-transitory computer-readable medium of claim 13, wherein an attribute is related to one or more character information included in the plurality of files by a tag in a predetermined form.

16. The non-transitory computer-readable medium of claim 13, wherein the character information includes at least one of a character or a plurality of characters.

17. The non-transitory computer-readable medium of claim 13, wherein existence information includes a bitmap including one or more rows and bits indicated by a plurality of columns for a row, each of the one or more rows corresponding to each combination of the character information and an attribute relating to the character information, each of the plurality of columns corresponding to each of the plurality of files for each of the one or more rows, and each value of the bits indicating whether or not a combination corresponding to a row exists in each file in the plurality of files corresponding to each column in the plurality of columns.

18. The non-transitory computer-readable medium of claim 17 wherein based on a frequency of one or more files including the combination of the character information and the attribute relating to the character information for the plurality of files, the existence information includes a row including the bits where each bit corresponding to each of a plurality of combinations is calculated by a logical product.

* * * * *